United States Patent [19]
Hubbard et al.

[11] 3,984,319
[45] Oct. 5, 1976

[54] MEMBRANE SEPARATION EQUIPMENT

[75] Inventors: Peter J. Hubbard, Darien; Eric L. Sandstrom, Bethel, both of Conn.

[73] Assignee: Dorr-Oliver Incorporated, Stamford, Conn.

[22] Filed: Jan. 6, 1975

[21] Appl. No.: 538,734

Related U.S. Application Data

[62] Division of Ser. No. 356,727, May 3, 1973, Pat. No. 3,893,920.

[52] U.S. Cl. .............................. 210/136; 210/321 R; 210/323 R
[51] Int. Cl.² ........................................ B01D 31/00
[58] Field of Search ........... 210/321, 323, 541, 542, 210/136

[56] References Cited
UNITED STATES PATENTS

| | | | |
|---|---|---|---|
| 2,519,663 | 8/1950 | Klein, Jr. ............................ | 210/323 |
| 3,457,170 | 7/1969 | Havens ........................... | 210/321 X |
| 3,722,694 | 3/1973 | Agranat ............................. | 210/321 |
| 3,768,660 | 10/1973 | Block ................................. | 210/321 |

*Primary Examiner*—Frank A. Spear, Jr.
*Attorney, Agent, or Firm*—Burtsell J. Kearns; Theodore M. Jablon

[57] ABSTRACT

In a membrane separation device means for mounting a semi-permeable membrane separation unit on the sidewall of a casing including a plug member and releasable interlocking means for interconnecting the plug and separation unit to the sidewall with the plug member including permeate outlet means for discharging permeate from the separation unit.

3 Claims, 11 Drawing Figures

MEMBRANE SEPARATION EQUIPMENT

This is a division of application Ser. No. 356,727, filed May 3, 1973 which issued as U.S. Pat. No. 3,893,920 on July 8, 1975.

BACKGROUND OF THE INVENTION

The present invention relates to new and useful improvements in semi-permeable membrane separation equipment and in particular to means for housing and mounting membrane separation units in operative relationship within a casing.

In general use semi-permeable membrane separation units or cartridges are arranged within a casing or module assembly and function to separate a selected product or products from a carrier liquid fed to the separation unit. In one mode of use a pressure differential is maintained across the membrane surface as the product carrying liquid is fed under pressure across one side of the membrane surface. Liquid and selected dissolved solids are passed through pores in the membrane surface as a permeate product to a discharge outlet in the casing. The carrier liquid that is not passed through the membrane becomes concentrated with solids and which solids in certain processes is the product until a selected concentration level of solids is reached. The concentrated liquid is then drawn out of the casing and transmitted either to waste or returned to the process in accordance with the predetermined objectives of the particular separation process. Alternatively the permeate may be wasted, returned to process or otherwise utilized.

Membrane separation equipment of the general type mentioned is used in a wide variety of reverse osmosis and ultrafiltration processes. Among other presently well known uses of this equipment, but not limited thereto, are the processing of paint in electro-deposition processes; treatment of waste water; desalination processes; and in food processing such as the treatment of cheese whey.

In this equipment a variety of structures or cartridge assemblies have been used for supporting the membranes. In one type the membranes are formed on porous surfaces and wound into a spiral tube through which the carrier liquid is transmitted. In other units the membrane separation units are tubular in shape. Still another type cartridge unit is disclosed in U.S. Pat. No. 3,494,465 and includes porous sheets mounted on a supporting plate with the membranes formed on both sides of the porous sheets. The permeate passes through the membrane to the porous sheet and is then fed to the supporting plate. Specially designed casing structure is provided for housing these cartridges and which structure is complementary with the supporting plate for receiving the permeate. The casings are also provided with suitable outlets for the permeate output flow and the concentrated carrier liquid output.

In these known units the surface area available for membrane filtration is limited by the specially formed casing construction and cartridge structure. As a result the capability of external pump capacity for circulating the carrier liquid through the casing is also limited. In addition to the reduced separation capacity as the membrane surface area is reduced, there is a corresponding decrease in the volume of carrier liquid that can be processed through the unit. In known casings difficulties are also present in providing ready access to the cartridges for inspection and replacement. The latter problems are further complicated by the relatively complex casing structure and specially configurated wall portions for mounting the cartridges and providing suitable permeate outlets and the like.

It is an object of the present invention to provide a novel canister casing for housing semi-permeable membrane cartridges.

Another object is to provide a novel canister for supporting therein a plurality of membrane separation cartridges in parallel-series relationship.

A further object is to provide a canister wherein novel means are provided for circulating carrier liquid through the housing and wherein the overall surface area available for separation is increased while the overall size of the canister housing is reduced.

A still further object is to provide a novel canister wherein means are provided for permitting ready access to the separation cartridges and further include means for allowing ready removal and replacement thereof from the canister housing.

SUMMARY OF THE INVENTION

The present invention comprehends a novel canister casing for housing therein cartridges supporting semi-permeable membrane separation surfaces in parallel-series relationship. In one embodiment the canister comprises a generally rectangular shaped pressurized casing with the separation cartridges arranged on the inner walls of the casing in banks of parallel-series relationships. Ready releasable attaching means are provided for locating and securing the cartridges to the sidewalls of the casing. Circulation means including a centrally disposed impeller pump are provided in the casing for circulating a carrier liquid supplied to the canister across the membrane surfaces whereby a selected product is removed from the liquid as a permeate passing through the membrane surface. Flow directing means are arranged within the casing for controlling and properly channeling the circulating liquid from and between the pump means and cartridge surfaces. In a further embodiment there is provided a canister having an unpressurized housing with the circulation means depending from and detachably mounted on the housing cover.

The above and other advantages of the present invention will appear more fully hereinafter from a consideration of the detailed description which follows taken together with the accompanying drawings wherein two embodiments of the invention are illustrated.

GENERAL DESCRIPTION OF THE INVENTION

Figure 1:
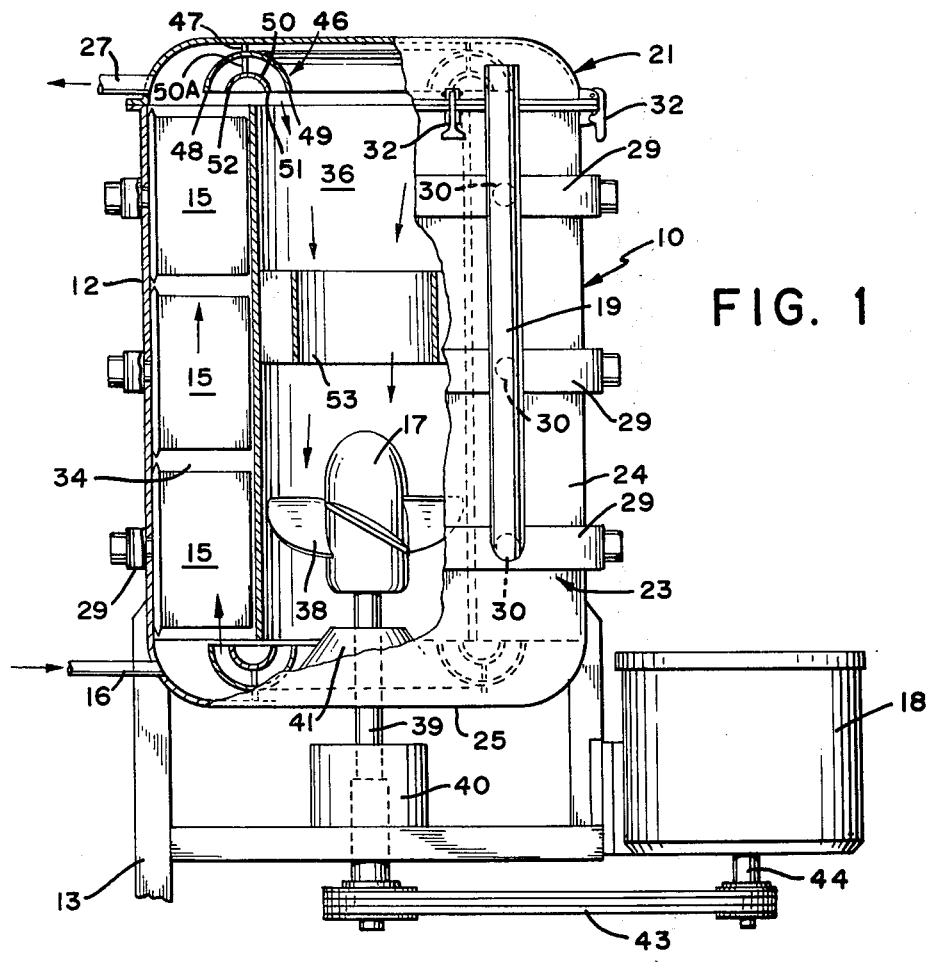
FIG. 1 is a front elevational view, partly shown in section, of a canister which houses semi-permeable membrane separation units and in which is incorporated one embodiment of the present invention.

Referring now to the drawings for a more detailed description of the present invention, a canister which incorporates one embodiment thereof is generally indicated by the reference numeral 12 in FIG. 1 and shown mounted on a supporting frame 13. A plurality of membrane separation cartridges 15 are secured to the inner walls of canister 12. An input conduit 16 for reception of a carrier fluid is provided at the base of canister 12. A circulation pump 17 driven by a motor 18 for circulating carrier liquid across the membrane surfaces of cartridges 15 is provided within canister 12 whereby a discharge of a permeate through a permeate discharge pipe 19 is effected in a manner to be hereinafter fully described in detail.

Canister 12 (FIGS. 1 and 3) comprise a pressurized steel housing which includes a steel cover 21 and a rectangular shaped steel main lower casing 23. Casing 23 includes spaced sidewalls 24 and a bottom wall 25. The carrier liquid input conduit 16 extends from the exterior of canister 12 through bottom wall 25. In a similar manner a bleed or effluent conduit 27 through which concentrated carrier liquid is withdrawn from canister 12 is provided in cover 21. Vertically spaced hollow channel members 29 are fixed to the outer surface of sidewalls 24 and extend around the outer surface of canister 12. Channel members 29 function to receive permeate from canister 12 which is directed along channel members 29 to a single permeate outlet pipe 19 which is interconnected to all channels 29 and has openings 30 (FIG. 3) in communication therewith.

The lower peripheral edges of cover 21 secured in sealed detachable relationship to main casing 23 by toggle type latch members 32 (shown in latched position in FIG. 1). Suitable sealing strips (not shown) are provided between the adjacent edges of casing 23 and cover 21 to prevent leakage of carrier fluid from canister 12. As will be appreciated cover 21 is readily released from casing 23 to permit access to the interior of canister 12 when toggle latches 32 are moved to an unlatched position.

A bank of vertical compartments 34 (FIGS. 3 and 4) for housing membrane separation cartridges 15 are provided at each sidewall 24 of main casing 23 and which compartments are formed and separated one from the other by metal spacing members 35. A draft tube 36 is provided in casing 23 and comprises a cylindrical shaped conduit supported by spacing members 35. Draft tube 36 extends longitudinally of canister 12 and is open at both bottom wall 25 and cover 21 thereof.

Flow circulating means (FIG. 1) are disposed within draft tube 36 and includes circulation pump 17. Pump 17 comprises an impeller assembly 38 secured to one end of a rotatable shaft 39. Shaft 39 extends from draft tube 36 through bottom wall 25 into a bearing housing 40 on frame 13. Suitable bearing and sealing means (not shown but diagrammatically indicated by reference numeral 41) are provided for shaft 39 at bottom wall 25 to prevent leakage of carrier liquid and provide for proper rotation of shaft 39. A flexible drive belt 43 connects shaft 39 to the rotable shaft 44 of motor 18 which is also mounted on support frame 13.

Figure 2:
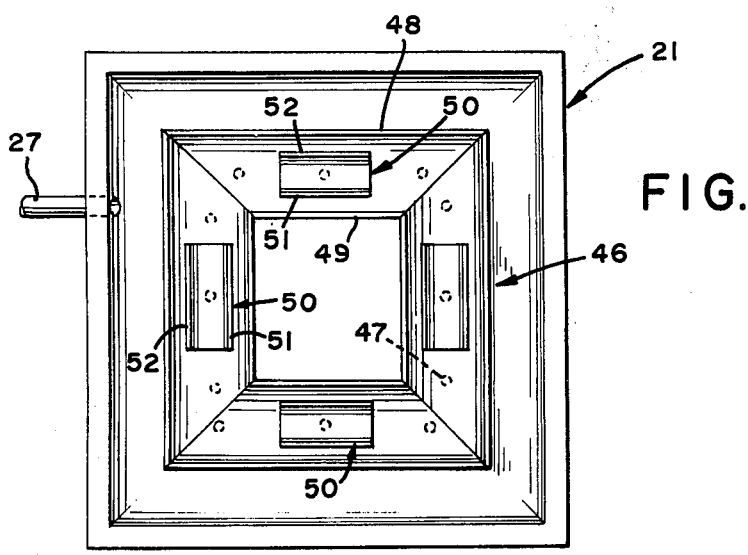
FIG. 2 is a sectional view taken on line 2—2 of FIG. 1.

Means for controlling and directing the flow of carrier liquid from draft tube 36 to cartridge compartments 34 are provided on cover 21 and bottom wall 25 of casing 23. The flow directing means on cover 21 are identical to the flow directing means provided on bottom wall 25 and description of the components thereof is directed to the means on cover 21. As seen in FIGS. 1 and 2 the flow directing means on cover 21 include a rectangular shaped vane member 46 which is of semi-circular cross-sectional configuration (FIG. 1). Vane 46 is suspended from cover 21 by struts 47 (FIG. 1) and includes outer and inner legs 48 and 49 (FIGS. 1 and 2). In closed position of cover 21 inner legs 49 are disposed over draft tube 36. The outer legs 48 (FIG. 4) are disposed over the top of the adjacent banks of membrane cartridge compartments 34. Additional curved vane members 50 (FIGS. 1 and 2) of shorter dimension than vane 46 are provided for each cartridge compartment bank. Vane 50 is suspended from strut 50A with the inner leg 51 of each vane disposed over draft tube 36 and the outer leg 50 over the top surfaces of the middle two cartridge compartments 34. As illustrated in FIG. 1 an open circular vane 53 is arranged within tube 36 above the impeller assembly 38.

Figure 5:
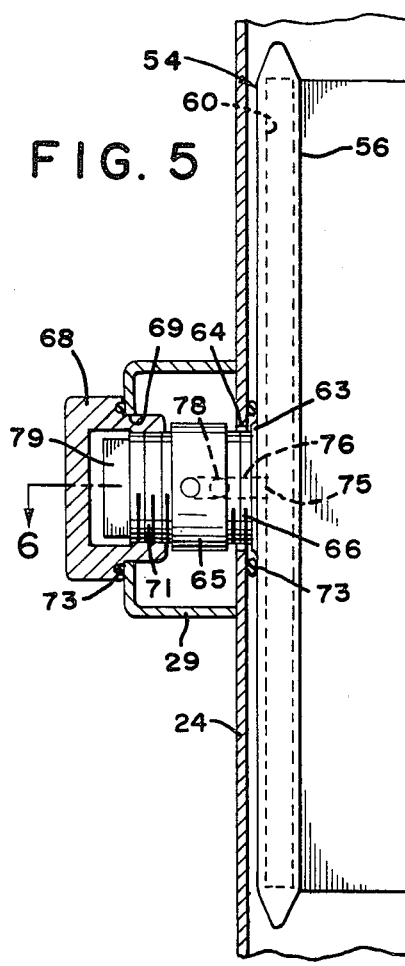
FIG. 5 is an enlarged side elevational view showing one of the membrane separation units secured to a sidewall of the canister housing.
Figure 6:
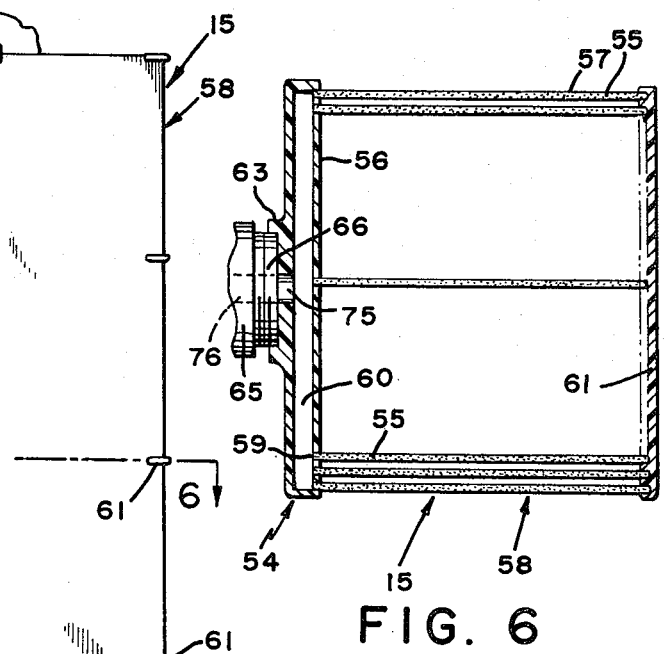
FIG. 6 is a sectional view taken on line 6—6 of FIG. 5.
Figure 7:
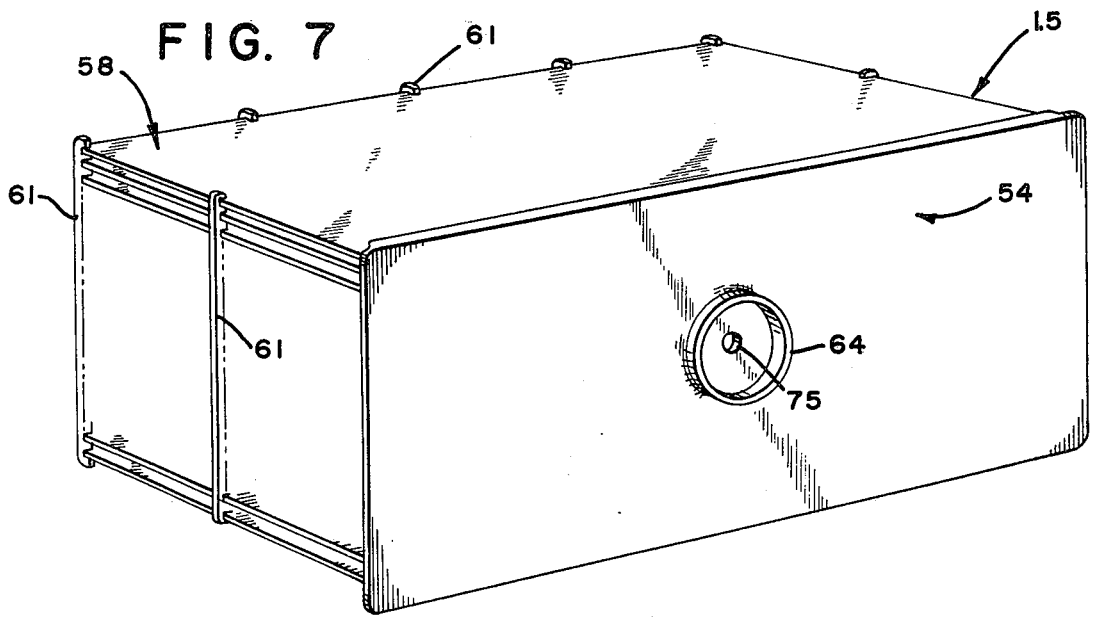
FIG. 7 is a perspective view of a membrane separation cartridge.

Membrane cartridges 15 are similar to those disclosed in the mentioned U.S. Pat. No. 3,494,465. Each cartridge 15 (FIGS. 5, 6 and 7) includes a hollow supporting plate or manifold 54 made of suitable hard plastic material. A plurality of leaf members 55 of suitable porous material such as phenobic treated filter paper are mounted on the bottom wall 56 of manifold 54. The free edge and both faces of each leaf 55 are coated with a semi-permeable membrane 57 having pores of predetermined dimensions in a known manner such as that described in U.S. Pat. No. 3,508,994 to provide a completed membrane leaf 58. The bottom edge 59 of each porous leaf 55 is uncoated and is open to the hollow interior 60 of the manifold plate 54. A plurality of plastic spacer bars 61 are provided at intervals on each membrane cartridge 15 and are provided with slots snap fitted over adjacent edges of leaves 58 to maintain the spacing between adjacent membrane leaves 58.

In this manner as fully described in the mentioned patents, as a carrier liquid is passed between the interstitial spaces between membrane leaves 58 a separation of constituents of the liquid is effected. A portion of the liquid with the product dissolved will penetrate through the pores in the membrane surfaces 57 and pass into porous leaf 55 as a permeate and outwardly from the free edge 59 thereof to collect in the hollow area 60 of manifold 54.

Figure 3:
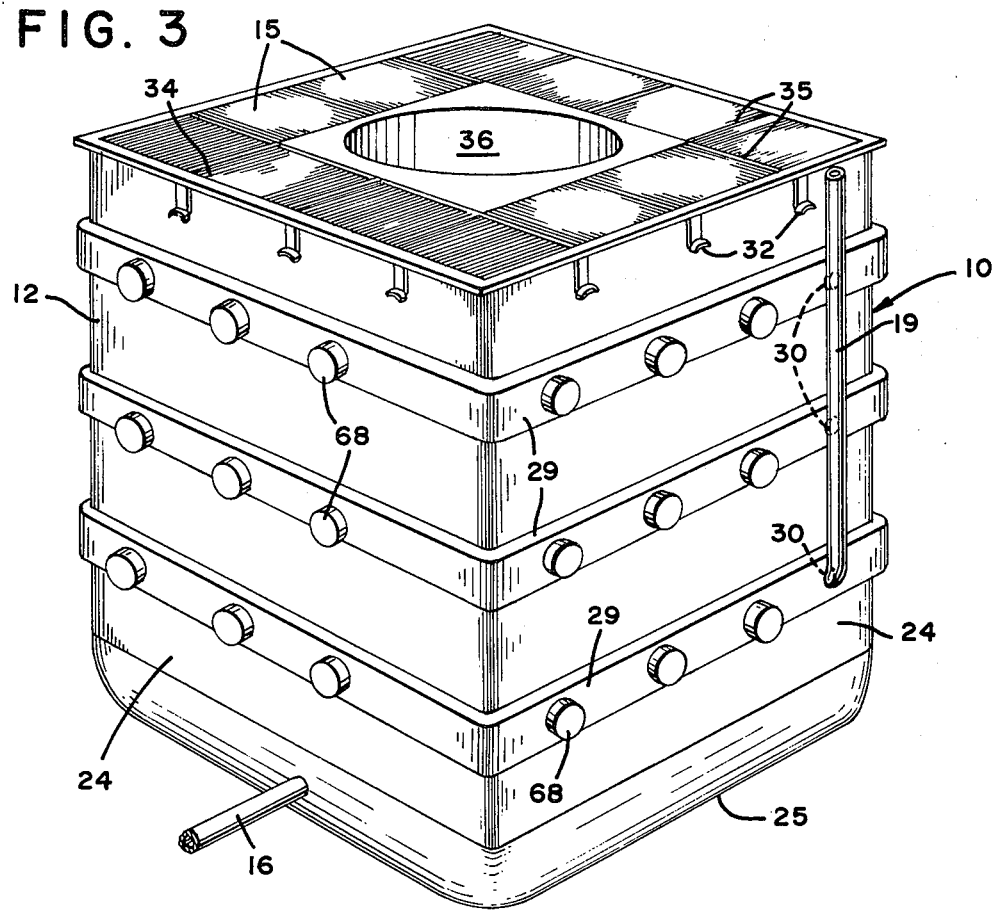
FIG. 3 is a perspective view of the canister of FIG. 1 with the cover removed.
Figure 4:
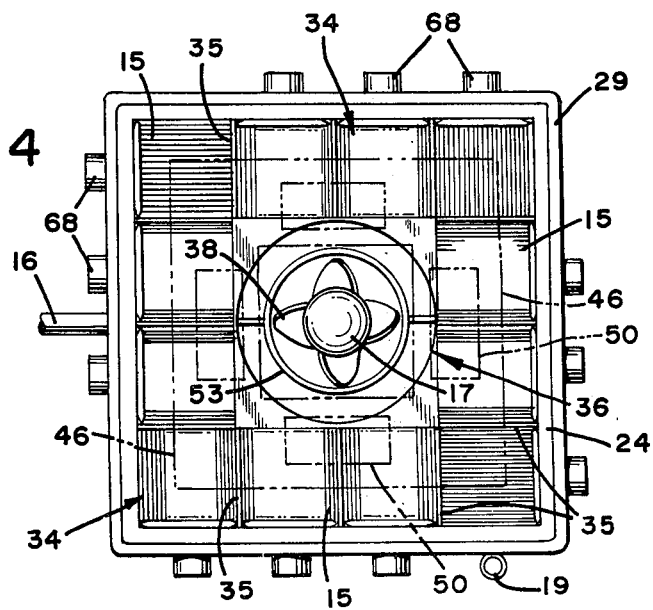
FIG. 4 is a top plan view of the canister shown in FIG. 3.

As seen in FIGS. 1, 3 and 4 membrane cartridges 15 are provided in parallel banks of three cartridge compartments 34 at each sidewall 24 of canister 12. Each compartment 34 includes three membrane cartridges 15 arranged in series in space vertical relationship one with the other on one sidewall 24. In this manner in the embodiment of FIGS. 1 to 7 there are provided nine membrane cartridges at each sidewall 24. In one operative design of the disclosed canister embodiment each cartridge has a filter surface of 18 square feet resulting in a total available filtering surface of 162 square feet at each sidewall 24 and a total canister capacity of 648 square feet within a canister area of only 22 cubic feet.

As mentioned it is a feature of this invention to provide novel means for locating and securing cartridge units 15 to sidewall 24. To this end each manifold 54 is provided with a raised boss portion 63 (FIGS. 5–7) mounted in a communicating outlet port opening 64 in sidewall 24 which opens into an adjacent flanged permeate channel 29 on the outer surface of canister 12. Permeate transmitting plug members 65 are provided with a first threaded portion 66 threaded into boss portion 63. An outer detachable cap member 68 extends through an opening 69 in permeate channel 29 and is in turn threaded about a second threaded portion 69 of plug 65. Suitable 0-rings 73 are provided at the aligned openings 64 and 69 in the sidewall 24 and channel 29 to prevent leakage of permeate from canister 12. A permeate opening 75 is provided in manifold 54 in alignment with a central conduit 76 in permeate plug 65. Conduit 76 opens to the interior of the permeate channel 29. A suitable check valve 78 is provided in plug 65 within conduit 76 (diagrammatically shown in FIG. 5) to prevent reverse flow of permeate to manifold 54.

In this manner membrane cartridges may be readily attached or detachably secured to sidewall 24 as desired. If it is desired to remove a cartridge 15 from canister 12, cover 21 is first removed from main casing 23. Cap 68 of the selected cartridge 15 is unthreaded from plug 65. A finger piece 79 on plug 65 is then rotated to release plug 65 from manifold 54 and in turn the cartridge from the sidewall 24.

In use of the canister assembly the input, bleed and permeate conduits are connected to suitable piping of the particular process used. A supply of carrier liquid is fed to canister from the selected process (not shown) through input tube 16 at a high flow rate to maintain a ratio of feed to permeate effluent in a range of 3 to 1 as high as 50 to 1. In one process use the canister of FIGS. 1 to 7 has been found suitable for food processing such as the treatment of cheese whey. As the feed or carrier liquid enters the draft tube 36 pump 17 is operated to circulate the feed material upwardly through the adjacent membrane cartridge compartments 34 as indicated by the directional arrows in FIG. 1. As the carrier liquid passes over the membrane surfaces a preselected separation of selected constituents in accordance with the preselected size of the membrane pores and requirements of the particular process is effected.

As a result of the fluid pressure differential existing between the interlaminate spaces of the membrane leaves 58 and interstitial spaces betweeen adjacent leaves 58, certain carrier liquid and dissolved constituents pass as a permeate into leaves 58 and thence to manifold plate 54 and outwardly of canister 12 through the permeate plug 65. The carrier liquid that does not pass through the membrane surfaces becomes concentrated with unpassed solids and is released as needed from canister 12 through effluent pipe 27.

As the concentrated flow leaves and enters compartments 34 it engages the flow directing means. Vanes 46 and 50 assure a proper circulation flow from the draft tube 36 to compartments 34 by controlling and turning the flow as indicated by the directional arrows in FIG. 1 into draft tube 36 from compartments 34 at cover 21 and from the draft tube 36 into compartments 34 at bottom wall 25. As mentioned when a selected concentration level is reached in the concentrate liquid the concentrate is bled from canister 12 through effluent tube 27 and wasted or returned to the process flow. The permeate collected in outer channel members 29 is drawn outwardly from channels 29 through permeate tube 19 by suitable external pump means (not shown).

In FIGS. 8 to 11 inclusive is shown in a further embodiment of the present invention wherein the modification of the canister and flow circulation means is illustrated as applied to an unpressurized canister housing 80. In FIGS. 8 to 11 corresponding reference numerals have been applied in certain instances to like elements previously described for the first embodiment.

Figure 8:
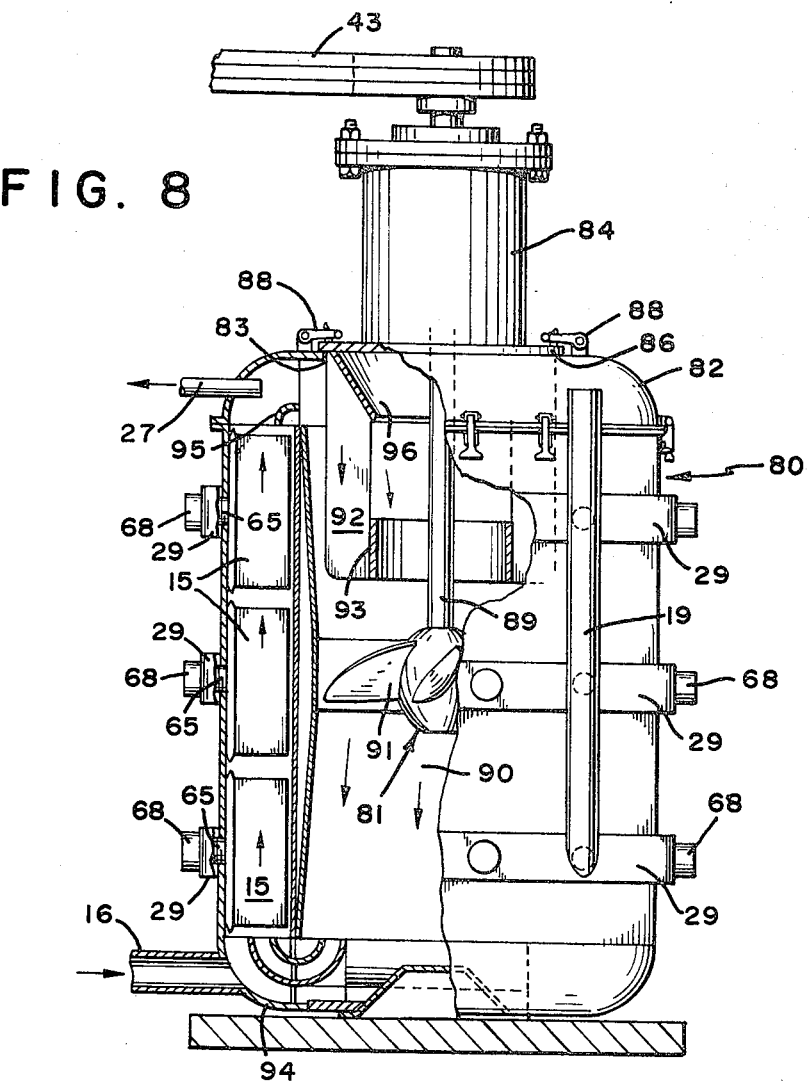
FIG. 8 is a front elevational view partly shown in section, of an alternate embodiment of the present invention.
Figure 9:
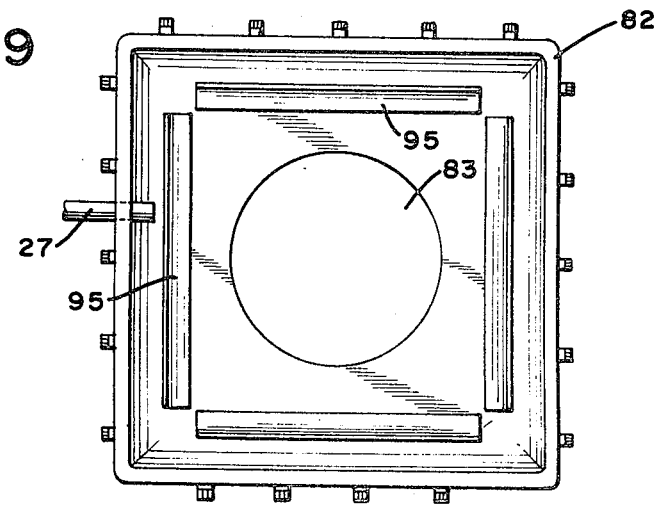
FIG. 9 is a sectional view taken on line 9—9 of FIG. 8.

As seen in FIG. 8 the pump assembly 81 is mounted on the upper cover 82 of canister 80. To this end cover 82 is provided with an opening 83 through which depends the circulation pump 81. Circulation pump 81 includes an outer bearing housing 84 having a bottom wall portion 86 seated on the surface of cover 82 and secured thereto by detachable latch members 88. Suitable sealing means (not shown) are provided between adjacent parts of cover 82 and wall portion 86 about opening 83 to prevent leakage of carrier liquid from canister 80. Shaft 89 extends into draft tube 90 and is provided with a propeller assembly 91. Shaft 89 is rotated by a drive belt 43 from drive motor (not shown).

Figure 10:
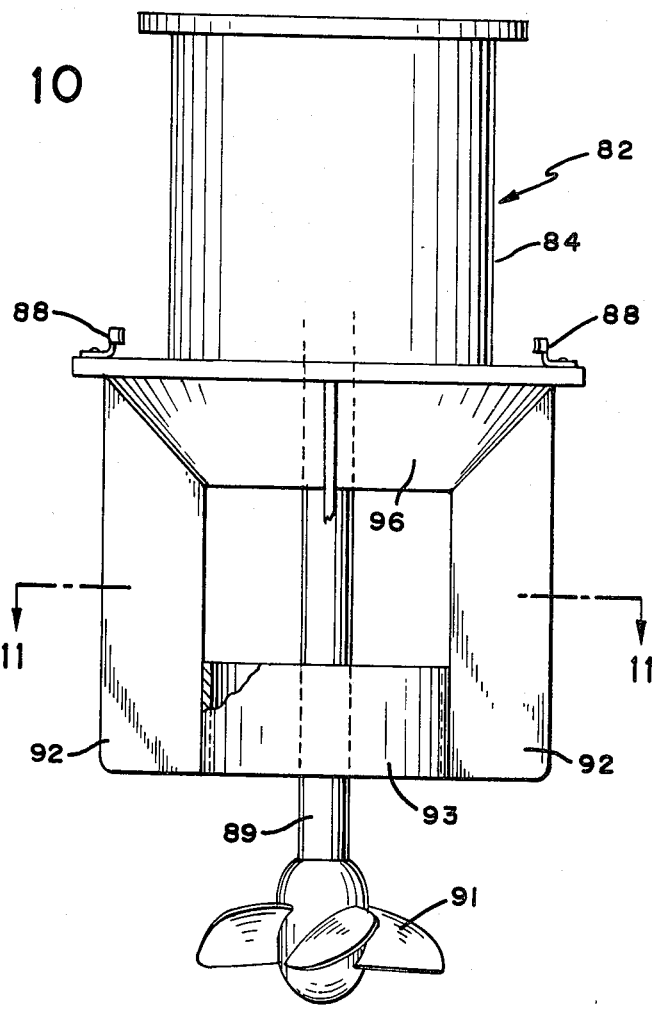
FIG. 10 is a front elevational view of the circulation pump assembly of FIG. 8 removed from the canister.
Figure 11:
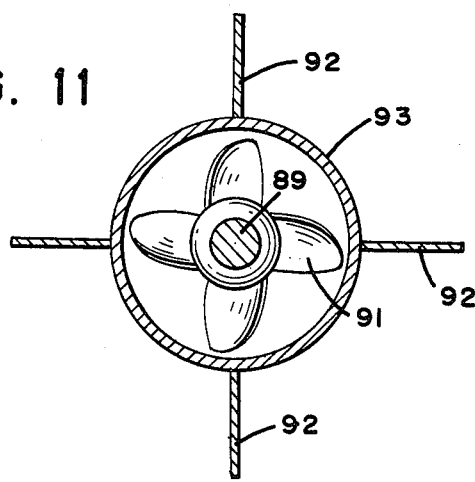
FIG. 11 is a sectional view taken on line 11—11 of FIG. 10.

Spaced flow directing fins 92 extend from a funnel-shaped plate 96 depending from bottom wall 86 of bearing housing 84. The lower portion of fins 92 are secured to a stiffening rim member 93 (FIGS. 10 and 11).

Membrane cartridges 15 in FIGS. 8 to 11 inclusive are identical to those described in the previous embodiment and are secured to the sidewalls 24 of canister 86 in an identical manner. In a like manner the carrier liquid input conduit 16 is provided on the outer sidewalls of canister 80. A bleed or effluent pipe 27 is located in cover 82 in a similar manner. The flow directing means on cover 82 differ from that previously described in that only a single wall vane surface 95 is provided on cover 82 (FIGS. 8 and 9) and cooperate with the outer surface of funnel plate 96 and fins 92 in directing the flow from cartridge compartments 34 to draft tube 96 as indicated by the directional arrows in FIG. 8.

As will be readily appreciated the structural arrangement of canister 80 permits ready removal of both the pump assembly 81 and cartridges 15 thereby permitting easy access to all parts of the canister for repair, cleaning or replacement.

It will be further apparent from the foregoing description that the novel canister and membrane cartridge arrangements disclosed have many advantages in use. Among other advantages is that increased filtration area and availability of membrane surface is provided within the disclosed canisters within a lesser casing area than previously achieved. The means for mounting the cartridge units on the sidewalls provide for increased circulation flow across the surfaces and allow for ready replacement of cartridges for cleaning or replacement or the like. The fact that the inner surfaces of the casing sidewall are not formed with conplicated recesses, drainage channels or the like allows for increased recirculation of the concentrated liquid within the canister greatly reducing clogging of interior spaces with solids or the like.

Further advantages of the described canister is the versatility thereof that they can be operated in varying processes. In the unpressurized housing an extraction pump can be used to provide pressure drops across the membrane surfaces by evacuating the permeate side of the membrane and using a feed pump to supply carrier liquid and bleed at minimal pressure. In a pressurized unit a feed pump is used to supply feed, bleed and operating pressure drops across the membrane surface or in combination with an extraction pump.

Although only two embodiments of the present invention have been illustrated and described in detail, it is to be expressly understood that the invention is not limited thereto. Various changes can be made in the design and arrangement of parts without departing from the spirit and scope of the invention as the same will now be understood by those skilled in the art.

What is claimed is:

1. In a device for housing in operative relationship a separation unit conprising a cartridge provided with a plurality of semi-permeable membrane surfaces for separating solids and a permeate from a carrier liquid fed to said device, said device comprising:
    a. an enclosed casing having inner and outer wall surfaces,
    b. inlet means for receiving the carrier liquid and outlet means for discharging a concentrated solution both provided on said casing,
    c. means mounting said separation unit within said casing upon said inner wall surface for ready removal therefrom,
    d. said mounting means including permeate discharge means comprising a plug member, means on said casing outer wall surface for positioning said plut on said outer wall in alignment with said separation unit within said casing, and interlocking means on said plug and separation unit comprising mutually threaded surfaces for releasably interconnecting said plug to said separation unit,
    e. permeate outlet means in said plug member for discharging permeate from said separation unit, and including a conduit in said plug aligned with a permeate discharge opening in said separation unit,
    f. a check valve contained within said plug member in sealing engagement with said discharge opening in said separation unit to prevent backflow of permeate from the plug conduit but permitting permeate flow thereto from said unit, and
    g. said mounting means further including a removable locking member secured to said plug by mutually threaded portions at the outer wall surface of said casing to secure said plug thereto and releasable from without said casing for permitting access to said interlocking means to detach said plug member from said separation unit and said unit from said casing inner wall for removal of said separation unit from said casing.

2. The device of claim 1 wherein said separation units comprise a plurality of porous leaf members mounted on a manifold support member, said membrane surfaces provided on said porous leaves for separating the permeate from the carrier liquid for transmission through said permeate outlet means, said leaves adapted to receive the permeate from said member and transport the permeate to the manifold support member, and wherein said interlocking means for securing said plug to said separation unit including corresponding threaded portions on said manifold and said plug member.

3. The device of claim 2 wherein said aligned permeate outlet conduits include an elongated conduit in said plug member and a conduit formed in said support member and in alignment with said plug conduit.

* * * * *